UNITED STATES PATENT OFFICE.

BURRITT S. LACY, OF PERTH AMBOY, NEW JERSEY, ASSIGNOR, BY MESNE ASSIGNMENTS, TO THE ROESSLER & HASSLACHER CHEMICAL COMPANY, A CORPORATION OF NEW YORK.

PROCESS OF MANUFACTURING METHYL CHLORID.

14,105. Specification of Reissued Letters Patent. Reissued Apr. 11, 1916.

No Drawing. Original No. 1,111,842, dated September 29, 1914, Serial No. 777,767. Application for reissue filed February 19, 1916. Serial No. 79,456.

*To all whom it may concern:*

Be it known that I, BURRITT S. LACY, a citizen of the United States, and resident of Perth Amboy, in the county of Middlesex and State of New Jersey, have invented new and useful Improvements in Processes of Manufacturing Methyl Chlorid, of which the following is a specification.

My invention relates to a process for the manufacture of methyl-chlorid and refers particularly to the reaction between methane and chlorin, the combination of which I effect in a quiet and economical way.

It is well known that in the chlorination of methane with the purpose of obtaining one of the four possible chlorids, serious difficulties have interfered with the success of the process. The most important of these difficulties consists in the tendency of chlorin to react explosively with separation of carbon, and in the fact that a mixture of the four chlorids of methane is obtained, from which it is difficult and expensive to isolate the pure substances, which boil at $-24°$, $+41°$, $+62°$, and $+78°$ centigrade. I have found, however, that by using a very great excess of methane over and above the theoretical proportions of equal parts by volume of methane and chlorin, the reaction, under certain conditions of temperature and material of reaction chamber pointed out more particularly below, goes smoothly, without separation of carbon, and in such a way that the chlorin reacts to form the monochlorid $CH_3Cl$ with only moderate amounts of the three other chlorids $CH_2Cl_2$, $CHCl_3$ and $CCl_4$. In carrying out my invention, I prefer to use a very great excess of methane because the yield of methyl-chlorid is the greater, the greater the excess of methane used.

The process is essentially as follows: Methane and chlorin in the proportions of not less than substantially about 10 to 1 by volume are allowed to mix just before passing into the reaction vessel which is preferably maintained at about 400° C. because a higher temperature tends to cause slight depositions of carbon which, however, is absolutely avoided at a temperature of about 400° centigrade.

As a material for the reaction vessel I prefer to use glass, quartz, porcelain, earthenware or the like material, partly because even dry chlorin at the aforesaid temperature attacks metals with great rapidity, but especially because I have found that it is not necessary to dry the methane before passing it into the reaction vessel and furthermore because by the use of these materials I avoid all decomposition of methane leading to a deposition of carbon on the walls of the reaction vessel. I have further observed that practically all of the chlorin under these circumstances is combined with, if the gases are passing at such a speed that they are exposed to the furnace temperature for a few seconds, for instance, about ten seconds.

The gases leaving the furnace consist of methyl-chlorid, hydrochloric acid, methane supplied in excess and of small amounts of the higher chlorids of methane. In order to remove the hydrochloric acid gas from the aforesaid mixture of gases the same are passed through an absorbent such as water which absorbs the hydrochloric acid gas, and the water vapor taken up by the gas current is then removed by passing the gases over a suitable drying agent such as concentrated sulfuric acid whereby the remaining mixture is brought into a state allowing a separation of the methyl-chlorid from the methane. I have found that this separation can be effected in a highly satisfactory degree by the employment of certain combinations of pressure and low temperature. For example since methyl-chlorid boils at $-24°$ centigrade while methane boils at $-164°$ centigrade the purpose pointed out above may be accomplished in several ways, viz: A. I may cool the mixture of methane and methyl-chlorid to a temperature of about $-120°$ C. under a pressure of about one atmosphere whereby the methyl-chlorid, together with the small amounts of the other three chlorids of methane present, condenses out, the methyl-chlorid being then in the solid form, melting at $-103°$ centigrade, or B. I may employ a temperature of about $-80°$ C. at about 150 lbs. pressure, or, C. I may employ a temperature of about $-30°$ C. with about 1500 lbs. pressure per square inch, in either of which latter examples practically all of the methyl-chlorid, together with the other three chlorids of methane, liquefies out.

With any of the above sets of conditions the separation of the methyl-chlorid is substantially complete, and the methane, substantially free from methyl-chlorid, passes on to a gas holder to be subsequently mixed with fresh chlorin to repeat the whole process. The methyl-chlorid so obtained may be used directly or may be stored in strong cylinders, the vapor pressure of the liquid being about 5 atmospheres at 20° C.

In connection with "A", it should be noted that the methyl-chlorid separates out as a solid, the handling of which presents some mechanical difficulties which do not exist when the material is in the liquid form. As between "B" and "C", I prefer "B", inasmuch as I find it more convenient to avoid the excessive pressure involved in "C". It might be anticipated that at these low temperatures, difficulties might arise on account of the freezing of the trace of higher chlorids formed with the methyl-chlorid. I have discovered that, as a matter of fact, such difficulties do not arise; even when a considerable amount of carbon tetrachlorid (melting point —30°) is present, no solid separates out under the conditions of B, a result due no doubt to the solvent effect of the methyl-chlorid, so that only liquid and gas have to be dealt with.

It should be noted that the methane may be stored over water, as I have observed that the moisture thereby introduced into the methane does not prevent the successful operation of my process.

It is understood that I do not in any way limit myself to the exact conditions mentioned in the foregoing, since these may be naturally varied considerably without departing from the general principles of the invention.

I claim:

1. The process of manufacturing methyl-chlorid from methane and chlorin gas, consisting in mixing chlorin gas with not less than ten times its volume of methane and bringing said mixture to reaction.

2. The process of manufacturing methyl-chlorid from methane and chlorin gas, consisting in mixing chlorin gas with not less than ten times its volume of methane close to the reaction vessel before entering same and causing the mixture to react within a suitable reaction vessel.

3. The process of manufacturing methyl-chlorid from methane and chlorin gas, consisting in mixing chlorin gas with not less than ten times its volume of methane close to the reaction vessel before entering same and causing the mixture to react within a non-metallic reaction vessel.

4. The process of manufacturing methyl-chlorid from methane and chlorin gas, consisting in mixing chlorin gas with not less than ten times its volume of methane close to the reaction vessel before entering same and causing the mixture to react within a reaction vessel made of quartz.

5. The process of manufacturing methyl-chlorid from methane and chlorin gas, consisting in mixing chlorin gas with not less than ten times its volume of methane, passing said mixture through a reaction vessel of quartz and maintaining said vessel at a suitable temperature.

6. The process of manufacturing methyl-chlorid from methane and chlorin gas, consisting in mixing chlorin gas with not less than ten times its volume of methane, passing said mixture through a reaction vessel of quartz and maintaining said reaction vessel at a temperature of about 400° centigrade.

7. The process of manufacturing methyl-chlorid from methane and chlorin gas, consisting in mixing chlorin gas with not less than ten times its volume of moist methane, passing said mixture through a reaction vessel of quartz and maintaining said reaction vessel at a temperature of about 400° centigrade.

8. The process of manufacturing methyl-chlorid from methane and chlorin, consisting in mixing chlorin gas with not less than ten times its volume of methane, exposing said gas mixture to a temperature of about 400° C. while passing through a non-metallic reaction vessel, washing the obtained reaction gases with water to remove the hydrochloric acid gas, drying the remaining gases by passing same over a suitable drying agent and separating the methyl-chlorin from the unused methane by means of suitable cold and pressure.

9. The process of manufacturing methyl-chlorid from methane and chlorin, consisting in mixing chlorin gas with not less than ten times its volume of methane, exposing said gas mixture to a temperature of about 400 C. while passing through a non-metallic reaction vessel, washing the obtained reaction gases with water to remove the hydrochloric acid gas, drying the remaining gases by passing same over a suitable drying agent, and separating the methyl-chlorid from the unused methane by compressing the mixture to about 150 lbs. of pressure per square inch and cooling the mixture in the compressed state to about —80° C.

In testimony whereof, I have signed this specification in the presence of two subscribing witnesses.

BURRITT S. LACY.

Witnesses:

ERNEST STOREKEN,
HARLAN A. BOND.